United States Patent [19]

Mengel

[11] Patent Number: 5,412,639
[45] Date of Patent: May 2, 1995

[54] COMPACT DISC FOCUSING AND POSITIONING CORRECTION PROCESS

[76] Inventor: Clare L. Mengel, 750 Lily Flagg Rd., Huntsville, Ala. 35802

[21] Appl. No.: 234,718

[22] Filed: Apr. 28, 1994

[51] Int. Cl.[6] .......................... G11B 3/58; G11B 7/00
[52] U.S. Cl. ..................................... 369/72; 369/100; 369/272
[58] Field of Search .................. 369/100, 110, 72, 73, 369/272

[56] References Cited

U.S. PATENT DOCUMENTS

| | | | |
|---|---|---|---|
| 4,083,073 | 4/1978 | Bernardini | 369/72 X |
| 4,520,470 | 5/1985 | D'Arc | 360/137 X |
| 4,819,223 | 4/1989 | Gregg | 369/100 X |
| 4,839,882 | 6/1989 | Janssen | 369/100 X |
| 4,853,912 | 8/1989 | Akasaka et al. | 369/100 X |
| 4,855,985 | 8/1989 | Sichel | 369/100 |
| 5,063,556 | 11/1991 | Chikuma | 369/100 X |
| 5,206,850 | 4/1993 | Tezuka et al. | 369/100 X |

Primary Examiner—Edward K. Look
Assistant Examiner—Hoang Nguyen

[57] ABSTRACT

The herein described invention pinpoints the problem plaguing the high quality reproduction of which the overall compact disc system is inherently capable. A disc manufacturing problem has been cited in the invention resulting in playback inadequacies resulting from a combination of the playback compact disc player and compact disc design and manufacture. A simple method for correcting already purchased discs is described. Several options are available to the disc manufacturer. The listener of contemporary corrected compact disc recorded sound, played by a compact disc player, will hear with much greater detail, depth, and clarity as contrasted to listening to a like disc which does not have the correction applied to the disc.

5 Claims, 3 Drawing Sheets

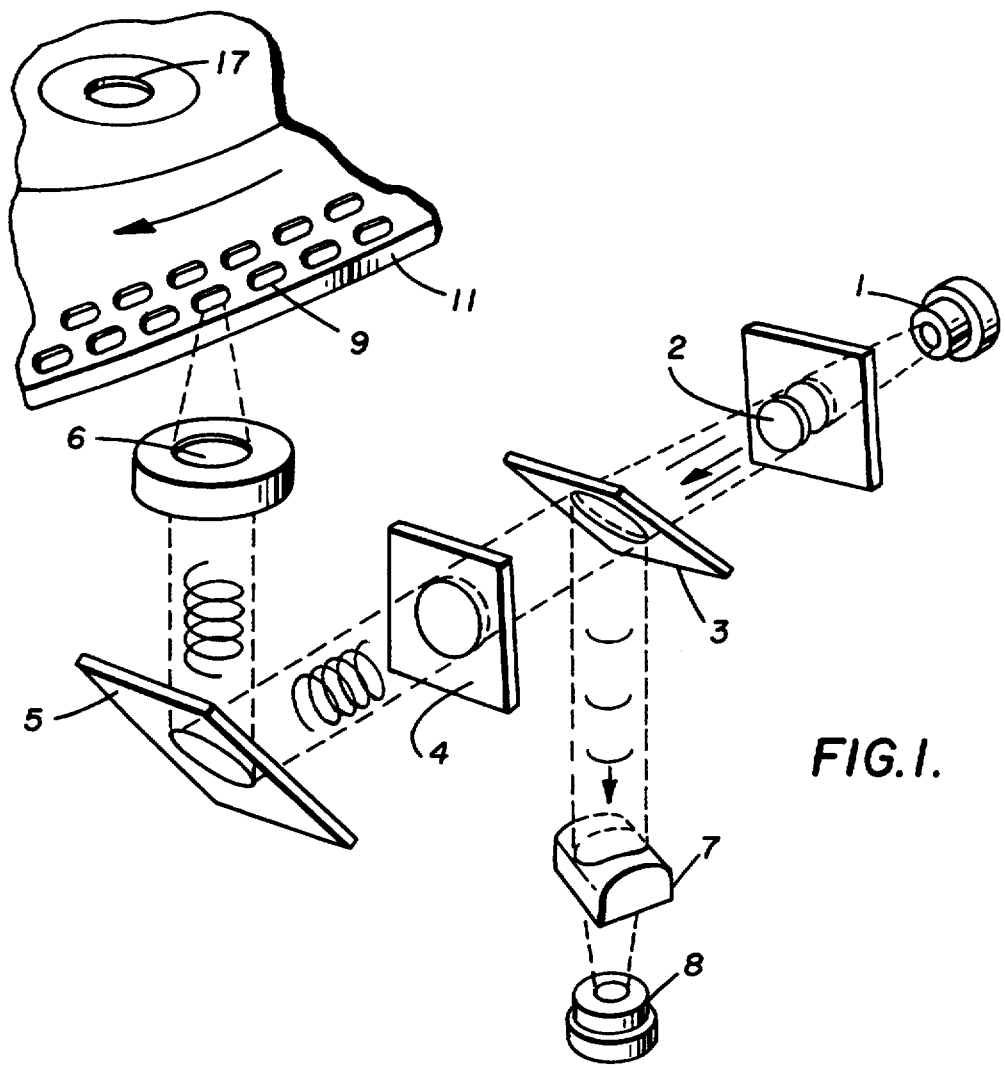
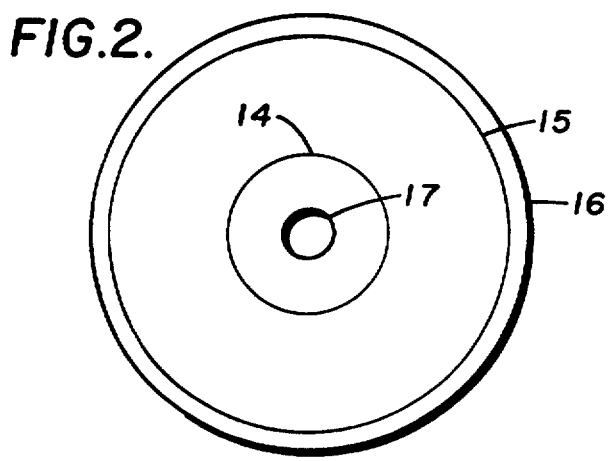
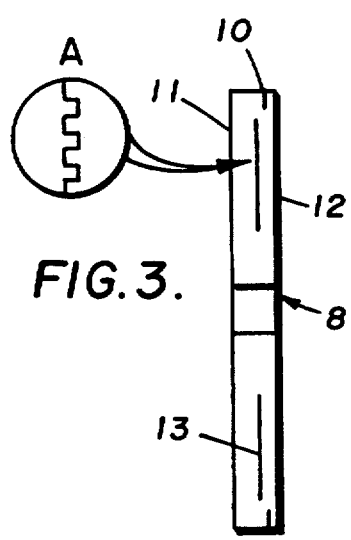
FIG.1.
FIG.2.
FIG.3.

COMPACT DISC FOCUSING AND POSITIONING CORRECTION PROCESS

BACKGROUND OF THE INVENTION

1. Field of the Invention

The herein described invention deals with the quality of information recorded on all contemporary compact discs when played back with conventional compact disc players. An improvement beyond any doubt exists when the herein described modification is made to the now existing compact discs. The same method for improvement to manufactured discs could be made during the time of manufacturing. With the introduction of compact discs for music reproduction, the quality of prerecorded music has experienced a major step forward in volume range and frequency response. Ease of handling is much improved over traditional playback recording methods. Only the open reel tape commercially prerecorded analog recordings are comparable in overall fidelity to the contemporary digital compact disc recording. The compact disc is far superior in handling ease. However, from the very first introduction of the digital compact disc recording, a subjective evaluation by many listeners gave rise to opinions such as: "it has digital edginess to the sound"; "it sounds hard and harsh". Many trained listeners thought it was the digital technique itself; however, playback of digital tape recordings showed that the technique was viable. This leaves the disc design and manufacture as the offending item in the recording and playback chain.

2. Description of the Prior Art

The inventor has not found a method like, or even similar to, the herein described concept.

BACKGROUND INFORMATION

The inventor considers himself as one who felt that compact disc music, when played back through any of the compact disc players, including the most advanced, did not sound as musical, and lacked the clarity and purity of tone of the open reel analog tapes of the same compact disc recorded music. Many original open reel tapes are now copied onto the compact disc and labeled AAD. Subjective comparisons between open reel recordings and discs are relatively easy to make. The compact disc music did not sound musical during certain passages and the voices were not as clear. The overall sound came as muddied or incoherent. The inventor studied the theory and made numerous experiments in an attempt to determine what might be the cause of such observable manifestations described above.

A two-pronged approach to the herein described invention is taken in this application as follows:

1: There are millions of compact discs in the hands of consumers, and these discs must be given a chance to be improved. Considerable research and development time has been spent developing a process which will provide an answer to this home remedy problem.
2: The herein described invention process can, and should, be applied to future manufactured compact discs and/or future compact disc players in a variety of ways further described herein.

DESCRIPTION OF THE INVENTION

The compact disc invention and development has been an almost miraculous achievement of scientific and physical laws applied to a very complicated device capable of being mass produced, a formidable achievement in itself. The focusing and the tracking of the laser readout beam are the most predominate areas of challenge. However, with all the technological breakthroughs made in the attainment of the compact disc, as mentioned above, many discs, when played back with excellent and the best technology players, have not been musically satisfying for a number of characteristics, such as: distortion, limited discerning of individual instruments, lack of ambience, lack in apparent dynamic frequency response, and a noteworthy high frequency "bite", now considered as a trademark of compact discs. In an elementary explanation of the compact disc, the information to be stored is engraved onto a thin metallic sheet, usually aluminum, in the form of "pits" which in turn make computer "bits". This metallic sheet is buried or encapsulated inside two plastic outer sheets. One sheet, the label side, called the substrate, is made of polycarbonate and the other opposing side is virtually clear and transparent to the readout laser beam and does have a required small dielectric constant. The two plastic sheets are fused together, including the edges, so that the engraved information sheet is not open to the atmosphere. The players readout laser is carefully and exactingly focused onto a small spot and must be kept that way or poor readout will result. A very elaborate method of tracking and focusing is employed. A single beam and a three beam method comprise the methods in use today. Little can be said as to which method is best, as both do the task intended for its design. From the beginning, the inventor suspected that the lack of readout clarity was in this area of technology. The exactness required for its ultimate operation is paramount. The inventor's theory was simply that a laser having the spot power, watts per centimeter, used for the readout player, elicited electrons to be freed from the information encapsulated metallic sheet. These electrons have no place to go except to charge the surrounding plastic which is a dielectric. This, also, results in a charged metallic readout sheet. Circular polarization of the laser beam is used in both players concepts. When the laser beam strikes the metallic sheet it is reflected from the "pits", mounds and valleys, which are read out, much as miniature radar would perform. Anything which would change the focus or cause an anomaly in the focus or tracking to occur would cause a distortion in the readout energy. There exists a phenomenon called the Quadratic Stark Effect, differentiated from the Stark effect because its effect is possible at much lower energy levels. The Quadratic Stark effect causes the rotation in polarization of a beam, such as a coherent polarized beam used in players, as it passes through the charged dielectric twice, once going to the reflecting metallic information sheet, and reflected by said charged metallic information sheet and then again as the beam returns through the same charged dielectric. The effect is doubled because the polarization is reversed on reflection. THEREFORE WE HAVE A LASER BEAM WHICH IS TOTALLY DEPENDENT ON THE ACCURACY OF A HIGH TOLERANCE FOCUSED SAID BE REFLECTING OFF A CHARGED CONDUCTOR CONTAINING THE RECORDED INFORMATION AND THROUGH AN ELECTRIC FIELD IN THE DIELECTRIC WHICH CAN CAUSE AN UNWANTED OR ANOMALOUS POLARIZATION SHIFT TO OCCUR OTHER THAN THE PROCESS INFORMATION. The inventor pursued this theory by doing several experiments. Namely, No. 1. Placing sharp points on the outer edge of the disc using a tool which put a series of serrations on the edge with the intention that the points would bleed the charge away and cause the disc to sound better. This worked to an extent. It was minimal, but recognized to a trained listener. It did not work on all brands of compact discs nor did it perform as well on the single beam laser as it did on the three beam laser compact disc players. A subsequent experiment, No. 2, involved placing in intimate contact with the label side of the disc a conducting metallic plate, opposite the readout side. This will form a capacitor with the inside encapsulated sheet as one plate and the added conductor plate, separated by the dielectric polycarbonate plastic. The thought here was that this would form a capacitor and possibly bleed off the charge on the readout sheet while confining the field to the label side of the disc which is between the metallic sheet and the outside plate on the surface of the substrate or label side. Thus the readout laser beam would not pass through the electric field since the electric field would now be confined to the label side of the disc and not the readout plastic side. Some discs were improved remarkably and others were not so much improved. An observed audible effect occurred but the size of the outside metallic plate material requirement was greater on some than others. A tuning effect appeared needed. Some discs responded satisfactorily. There appeared to be a size of the plate requirement which did not fit all discs. The value of the capacitor was obviously critical to the specific disc involved. All of the faults were not corrected if the capacitor plate were not the correct size. After several experiments it became clear that the outside plate needed to be at least as large as the recorded information area. It was concluded that the entire label side should be covered with a metallic plate. However, it did show that the theory was correct. It now remained to find a simpler home remedy solution; to either keep the charge from accumulating or bleed it off quickly. The next experiment, No. 3, worked better. Some discs have their metallic readout sheet extending out towards the edge of the disc to within a small distance, while some are ended at about an eighth of an inch, or more, from the edge. This experiment consisted of filing a notch into the edge so as to encounter the metallic information sheet and exposing the sheet to the air. THIS WORKED WELL. MANY FAULTS WERE CORRECTED. THE INFORMATION RENDERED BY THE PLAYER RESEMBLED WHAT ONE WOULD EXPECT FROM THE ORIGINAL, VERY COMPLICATED, WELL-DESIGNED AND THOUGHT-OUT COMPACT DISC AND ITS ASSOCIATED PLAYER. Filing a notch was a chore on some compact discs such as Telarc, because they stop the metallic sheet too far into the disc. Some Columbia, now Sony, have this deeply embedded readout sheets. London was an easy fix since the sheet comes out nearly, but not quite, to the edge. Still it is embedded about one eighth of an inch.

THE RECOMMENDED SOLUTION FOR THE DISC MANUFACTURER IS TO BRING THE SHEET OUT TO THE AIR AND NOT COMPLETELY ENCAPSULATE IT, OR BRING OUT JUST A TAB TO THE AIR OUTSIDE AND CONNECTED ELECTRICALLY TO THE INFORMATION ENGRAVED CONDUCTING SHEET. Experiment No. 4 consisted of taking a sharp instrument and severing the plastic label side with a radial thin slit in the label side of the disc, severing to and/or through the conducting information encapsulated conducting sheet only, but not through the readout plastic side. This requires a rather firm pressure on the said sharp instrument and starting at a point from the inner beginning of the metallic sheet to the outer edge and including the edge or periphery of the disc. The severing can be accomplished by any other number of ways including a hot soldering iron having a sharp point tip, the outer plastic layer being melted to expose the said metallic sheet. The slit can be anywhere on the label side of the disc so long as it is over the metallic sheet and radial. The reason for making an electric field dissipation line completely across the metallic sheet is because all discs are not alike and to predict ahead of time how short or how long a line needed is not technically affective, and since no harm is done except energy of the task master expended, it is recommended that the above procedure be adopted. Furthermore, it is certain therefore, that the surface dissipation area is also as large as needed. The firm severing pressure, but not inordinate, is because the polycarbonate is a hard plastic. This slit allows the charge on the conducting sheet to dissipate or not accumulate by bleeding the charge through the slit to the air. Another excellent method for making the slit in the label side of the disc is to punctulate a line across the label side of the disc encompassing the metallic sheet, creating a radial slit. A good high quality reciprocating pointed impact device serves well. These compact disc remedies result in elimination of spurious and unwanted polarization rotation within the well designed feedback loop with consequent improved focusing and tracking of the readout laser beam. The slit is so thin that no disc playback information is lost but the sound is corrected and miraculously improved. All the above-mentioned disadvantages attributed to the compact disc have disappeared and the compact disc now stands alone as an entity in sound reproduction. It should be said at this point that the capacitor correction process evaluation done before this experiment was not complete until this experiment was successful since there was no criteria from which to judge. The slit technique was completely successful. The capacitor experiment will work also, but it is very cumbersome for the disc home consumer to use. A newly designed compact disc player with a built-in capacitor would be a successful endeavor.

BRIEF DESCRIPTION OF THE DRAWINGS

FIG. 1 is a simplified drawing to illustrate the degree of complication and sophisticated design which is in every compact disc player.

FIG. 2 shows a beginning and end of a metallic sheet.

FIG. 3 shows a replica of the compact disc.

DESCRIPTION OF THE INVENTION USING DRAWINGS

The drawings used to further explain the invention are enhanced in size so that the explanation can be more easily understood. For instance, the disc is one hundred and twenty millimeters (120 mm) in diameter. The thickness of the actual disc is one point two (1.2) mm. To draw to scale on this dimension and relate would be cumbersome, therefore some liberties have been taken in drawing sizes for clarity. The focusing and tracking apparatus of a representative disc player pertinent to the invention is also simplified, but sufficient to illustrate the invention. FIG. No. 1 is a simplified drawing to illustrate the degree of complication and sophisticated design which is in every compact disc player. The diagram shown here is a three beam laser type. The other representative type is two beam laser mechanism. Both perform essentially the same task. In practice it is difficult to tell the difference. There are advantages and disadvantages to either one. None of the disadvantages of either type prevent their general, but not ultimate, fullest high fidelity usage. The heretofore identified problem exists for both types and the herein invention's improvement is a necessity for both types so that recorded playback improvement can be a reality.

Figure 4:
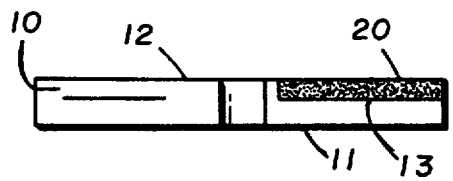
FIG. 4 shows a cross section of the sever made in experiment 4.
Figure 5:
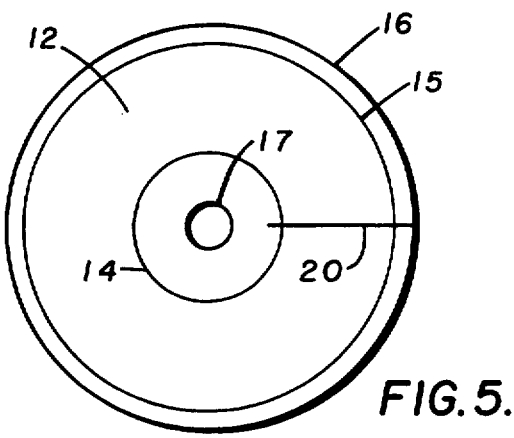
FIG. 5 shows the top, substrate or label side of the sever made.
Figure 6:
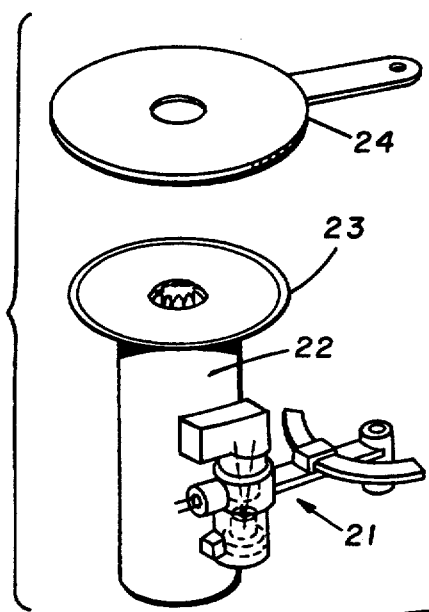
FIG. 6 shows a pictorial view of the mechanics of a contemporary compact disc player.
Figure 7:
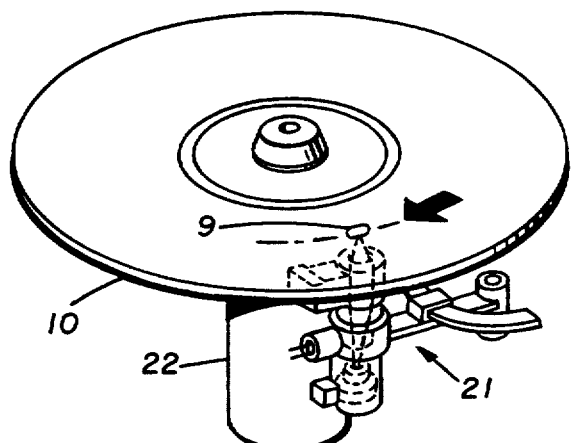
FIG. 7 shows a compact disc to be played in place on a turntable and a laser.
Figure 8:
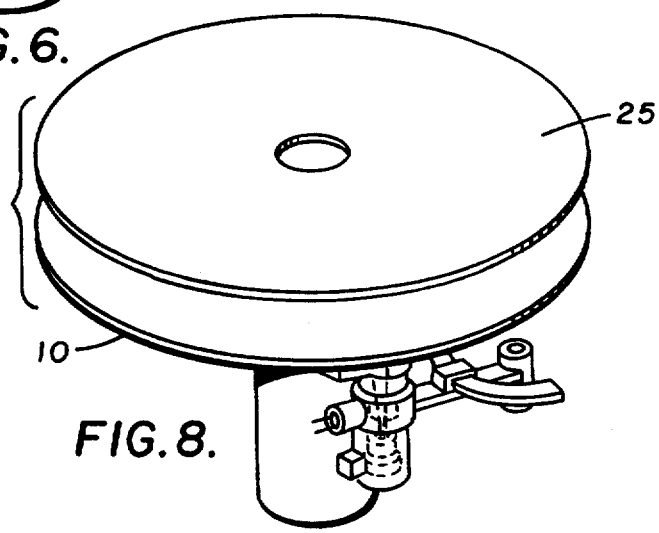
FIG. 8 shows a capacitor plate in the process of being played.
Figure 9:
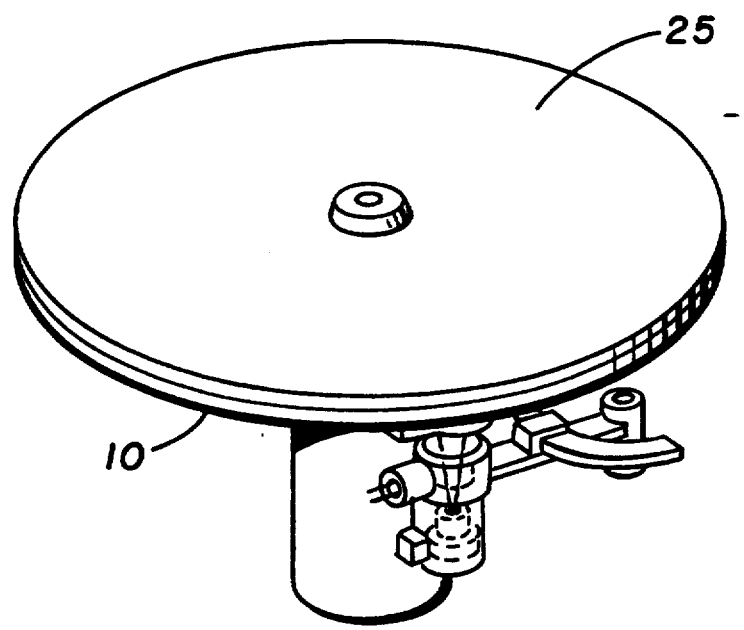
FIG. 9 shows the capacitor plate in place covering the label side of the disc.

No. 1 points to the laser which is a coherent source of optical energy, but with random polarization. No. 2 points to a linear polarizer or collimating lens. No 3 points to polarizing beam splitter to allow the laser energy to pass through to the Quarter wave plate, No. 4. The quarter wave plate converts the linear polarization to circular polarization. No. 5 is a mirror to allow a ninety degree direction change. No. 6 is the servo controlled cylindrical lens. This mechanism is a well designed device, but it is also the root of the problem because it is responsible for focusing the optical energy into a very fine beam, 0.5 micrometer tolerance, and to be able to distinguish "bumps" in the 110 nanometer range. A very stringent requirement. Unfortunately, as well as the system is designed, it does not have the necessary intelligence to recognize that it not focused on a reflection caused by the above mentioned Stark Effect and not only the information "bumps". It thinks it is doing a great job of focusing. In reality it is always out of focus without the corrections mentioned herein, the object of the invention. Eliminating the charge and the electric field lets the focus be accurate and is responsible for the tremendous improvement in playback fidelity. No. 7 is the cylindrical lens to focus the received energy onto No. 8 which is the laser reflected amplitude modulation information detector and the tracking detector. No 12 is the compact disc hub hole which provides the coupling to the motor which turns the compact disc No. 10. FIG. No. 3, No. 10 points to this replica of compact disc and, at the same time points to the dividing line of which the disc is composed into a substrate or label layer, approximately 0.5 mm and variable in thickness depending on the engraved information, and a readout layer joined hermetically by injection molding and virtually lossless to the readout laser. This places the reflecting metallic sheet encapsulated between two plastic layers. No. 11 points to the readout side of the disc and is applied last in the production process, usually by injection molding. No, 12 points to the label side of the disc and is made of polycarbonate. The standards for disc manufacturing call this the substrate. It is upon this substrate that the information is engraved and then the metallic sheet or film is deposited. Letter "A" points to a representation of this information. This information in the form of mounds and valleys is approximately 0.11 micrometers thick. The information is engraved in a spiral endless set of these mounds and valleys starting inside and spiraling out to the end of the information. These mounds and valleys, "pits" make up the "bits". The spacing between the adjacent row of "pits" in the spiral fashion is 1.6 micrometers. As can be seen, the optical radar to read and track any row of bits is a genuine challenge. Anything which would interfere with the focusing and/or the tracking of the readout laser beam would result in distortion of the players output. No. 13 points to the reflective layer herein called the metallic sheet. It is very thin and, in production, is usually deposited on the information engraved substrate. FIG. No. 2, No. 14 points to the beginning of the metallic sheet and No. 15 points to the end of the said sheet. No. 16 points to the edge of the disc. This edge is not a standard and takes many forms from a tapered to a smooth slightly raised edge. The distance between the edge and the metallic sheet is a variable from disc to disc. No. 17 points to the hub or the center of the disc. In the previous discussion about the invention, the added sheet to be applied to the outside to form a capacitor would have been applied to the surface area between Nos. 14 and 15 on the label side and would have covered a good size of this area to be successful. Referring to FIG. 4, No. 20 points to a cross section of the sever made as previously described in experiment No. 4, No. 20 in FIG. 5 shows the top, substrate or label side of the sever made. As can be seen, the sever, No. 20 allows the metallic sheet to come in direct contact with the atmosphere disallowing the previously described charge buildup. Now the focusing and tracking can be unhindered and will result in increased fidelity of the players readout quality as previously described. This making of a slit in the label side of the disc is a simple and effective fix for the home consumer. Described elsewhere are sample methods which the disc manufacturer might take to improve the disc players readout fidelity.

CONCLUSIONS

The herein described invention, that of eliminating the charge on the information readout metallic encapsulated sheet inherent to all compact discs when played by all players in use today, will improve the playback quality to what it would have been when compared to the original program material intended. It is the scope of the invention to localize the area of concern which is responsible for the poorer reproduced quality of current compact discs and their attendant players. Processes have been described which will eliminate the problem. Other methods not described can be implemented including modifications to the disc player itself. Those not described will not negate the scope of the invention.

I claim:

1. A process for providing improved read out of information on a metallic sheet encapsulated in a transparent dielectric disc, in combination comprising the steps of:

(a) constructing said metallic sheet having said information impressed thereon a series of rows, (b) generating an optical beam and directing said beam through said dielectric material onto said metallic sheet, (c) coupling said optical beam to apparatus for detecting reflections of said beam from said row wherein said beam is continuously positioned over said row and focused on said information in said row responsive to said reflections, and further wherein said beam impinging on said metallic sheet frees electrons, induces a charge in said metallic sheet and a charged surrounding dielectric with an associated electric field through which said beam passes, producing an anomalous polarization shift of said beam and said reflections which interferes with positioning and focusing of said beam, (d) neutralizes said charge on readout side of metallic sheet and associated electric field, allowing said beam to be positioned and focused without interference from said electric charge and associated electric field.

2. A process as set forth in claim 1 wherein a metallic plate is positioned contiguously to said transparent dielectric disc on a side opposite optical beam and in capacitive relation with said encapsulated metallic sheet, thereby capacitively capturing and increasing the field on said opposite side at the expense and neutralizing said electrostatic field on side of said metallic sheet disposed to receive said optical beam thereby allowing substantially correct focusing and positioning of said optical beam.

3. According to claim 2 the metallic plate is an aluminum disc the same diameter of said compact disc having a slightly larger hub hole.

4. According to claim 2 the metallic plate is about twenty thousandths thick.

5. According to claim 2 the metallic plate is flat within about five thousandths so as to fit closely to said compact disc.

* * * * *

UNITED STATES PATENT AND TRADEMARK OFFICE
CERTIFICATE OF CORRECTION

PATENT NO. : 5,412,639            Page 1 of 4

DATED : May 2, 1995

INVENTOR(S) : Clare L. Mengel

It is certified that error appears in the above-identified patent and that said Letters Patent is hereby corrected as shown below:

Column 6, line 43, after consumer. Insert the following:

__On a previous page herein, 4, a complete discussion about experiment No. 2 which produced equally effective results of the slit, is now described on drawing page No. 3. Fig No. 6 show a pictorial view of the mechanics of a contemporary compact disc player. No. 21 points to the unitized version of the schematic shown in No. 1. No. 22 points to the motor which drives the turntable No. 23. The turntable holds the disc to be played. No. 24 shows a clamp which clamps down on the disc when such disc is on the turntable. This clamp holds the disc in a tight position allowing the rotation of the disc without slipping. Fig No. 7 shows the compact disc to be played in place on the turntable No. 23 and the laser, focused and illuminating the disc. The arrow shows rotation. No. 9 indicates the bump previously shown to be detected. The crux of the invention is again described: the laser

UNITED STATES PATENT AND TRADEMARK OFFICE
CERTIFICATE OF CORRECTION

PATENT NO. : 5,412,639

DATED : May 2, 1995

INVENTOR(S) : Clare L. Mengel

It is certified that error appears in the above-identified patent and that said Letters Patent is hereby corrected as shown below:

whose power is highly concentrated because of focusing, in addition to detecting the bump also charges the metallic sheet buried in the dielectric material shown in Fig 3 as No. 13, and in Fig No. 10. The charging is dynamic, in that as long as the laser illuminates the metallic sheet charging of the sheet and associated dielectric continues. As soon as the laser is turned off, the charge no longer exists and cannot be measured. Fig No 8 shows the capacitor plate, No. 25 in the process of being placed and will cover the entire label side of the disc, No. 10 to be played. No. 25, the capacitor plate is a conducting plate the same size as the disc in diameter and is made of a light weight material, preferably aluminum. The plate is between fifteen thousandths and twenty five thousandths thick. Thin enough to be light and yet thick enough to be rigid. Fig No. 9 shows the capacitor plate, No. 25 in place covering the label side of the disc, No. 10, When the laser

UNITED STATES PATENT AND TRADEMARK OFFICE
CERTIFICATE OF CORRECTION

PATENT NO. : 5,412,639

DATED : May 2, 1995

INVENTOR(S) : Clare L. Mengel

Figure 10:
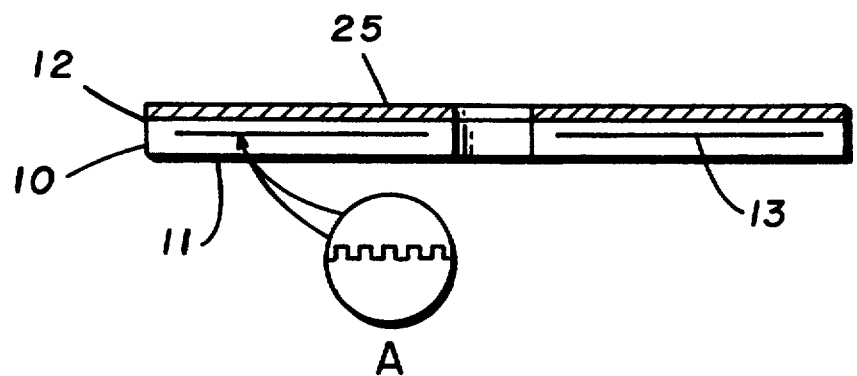
FIG. 10 shows a view similar to FIG. 3 except that the metallic plate is shown.

It is certified that error appears in the above-identified patent and that said Letters Patent is hereby corrected as shown below:

illuminates the disc causing the buried metallic sheet to be charged, pulls the said charge towards this label side, No. 12 and allows the laser to illuminate the readout information unaffected by an electric field being produced by the very same laser because all the field is now on the side opposite the readout side. Fig 10 shows a compact disc, No. 10. No. 11, the readout side of the disc, No. 12, the label side of the disc, similar to Fig No. 3 except that the metallic plate No. 25 is shown and it quite easily seen that the conducting capacitor plate makes a capacitor with the disc's dielectric buried metallic sheet, No. 13 with the added plate No. 25. The electric field now being between No. 13 and No.

UNITED STATES PATENT AND TRADEMARK OFFICE
CERTIFICATE OF CORRECTION

PATENT NO. : 5,412,639

DATED : May 2, 1995

INVENTOR(S) : Clare L. Mengel

It is certified that error appears in the above-identified patent and that said Letters Patent is hereby corrected as shown below:

12. The letter "A" shows an enlarged series of bumps, the readout information.--

Signed and Sealed this

Twenty-seventh Day of June, 1995

Attest:

BRUCE LEHMAN

Attesting Officer  Commissioner of Patents and Trademarks